United States Patent
Arnold et al.

(10) Patent No.: US 10,998,179 B2
(45) Date of Patent: May 4, 2021

(54) METHODS AND SYSTEMS FOR INCREASING SENSITIVITY OF DIRECT SAMPLING INTERFACES FOR MASS SPECTROMETRIC ANALYSIS

(71) Applicant: DH Technologies Development Pte. Ltd., Singapore (SG)

(72) Inventors: Don W. Arnold, Livermore, CA (US); Thomas R. Covey, Newmarket (CA); Chang Liu, Richmond Hill (CA)

(73) Assignee: DH Technologies Development Pte. Ltd., Singapore (SG)

(*) Notice: Subject to any disclaimer, the term of this patent is extended or adjusted under 35 U.S.C. 154(b) by 1 day.

(21) Appl. No.: 16/341,718

(22) PCT Filed: Oct. 12, 2017

(86) PCT No.: PCT/IB2017/056335
§ 371 (c)(1),
(2) Date: Apr. 12, 2019

(87) PCT Pub. No.: WO2018/069872
PCT Pub. Date: Apr. 19, 2018

(65) Prior Publication Data
US 2020/0043712 A1     Feb. 6, 2020

Related U.S. Application Data

(60) Provisional application No. 62/408,454, filed on Oct. 14, 2016.

(51) Int. Cl.
*H01J 49/04*     (2006.01)
*G01N 1/40*     (2006.01)
(Continued)

(52) U.S. Cl.
CPC .......... *H01J 49/0495* (2013.01); *G01N 1/405* (2013.01); *H01J 49/0404* (2013.01); *H01J 49/165* (2013.01); *G01N 2030/009* (2013.01)

(58) Field of Classification Search
CPC .... H01J 49/0404; H01J 49/0031; H01J 49/04; H01J 49/0495; G01N 30/72; G01N 1/04; G01N 2001/028; G01N 1/405
See application file for complete search history.

(56) References Cited

U.S. PATENT DOCUMENTS 5,208,458 A *  5/1993  Busch ............... G01N 1/34
                                                    250/281
8,637,813 B2 *  1/2014  Van Berkel ....... H01J 49/0463
                                                    250/288
(Continued)

FOREIGN PATENT DOCUMENTS

WO    2015-019159 A1    2/2015

OTHER PUBLICATIONS

International Search Report and Written Opinion for PCT/IB2017/056335 dated Feb. 5, 2018.
(Continued)

*Primary Examiner* — Wyatt A Stoffa (57) ABSTRACT

Methods and systems for delivering a liquid sample to an ion source for the generation of ions and subsequent analysis by mass spectrometry are provided herein. In accordance with various aspects of the present teachings, MS-based systems and methods are provided in which the flow of desorption solvent within a sampling probe fluidly coupled to an ion source can be selectively controlled such that one or more analyte species can be desorbed from a sample substrate inserted within the sampling probe within a decreased volume of desorption solvent for subsequently delivery to the ion source. In various aspects, sensitivity can be increased due to higher desorption efficiency (e.g., due to
(Continued)

increased desorption time) and/or decreased dilution of the desorbed analytes. The methods and systems described herein can additionally or alternatively provide for the selective control of the flow rate of the desorption solvent within the sampling interface so as to enable additional processing steps to occur within the sampling probe (e.g., multiple samplings, reactions).

18 Claims, 6 Drawing Sheets

(51) Int. Cl.
*H01J 49/16* (2006.01)
*G01N 30/00* (2006.01)

(56) References Cited

U.S. PATENT DOCUMENTS

| | | | | |
|---|---|---|---|---|
| 8,741,149 B2* | 6/2014 | Hughes | ............... | B01D 15/163 |
| | | | | 210/656 |
| 9,779,926 B2* | 10/2017 | Van Berkel | ........ | G01N 35/1095 |
| 10,115,577 B1* | 10/2018 | Eiler | .................... | H01J 49/063 |
| 10,151,727 B2* | 12/2018 | Kawabata | ............. | G01N 27/62 |
| 2002/0150926 A1* | 10/2002 | Jindal | .................... | G01N 30/88 |
| | | | | 435/6.12 |
| 2003/0193020 A1* | 10/2003 | Van Berkel | ......... | H01J 49/0404 |
| | | | | 250/288 |
| 2006/0169030 A1* | 8/2006 | Stewart | .................. | H01J 49/04 |
| | | | | 73/53.01 |
| 2009/0166525 A1* | 7/2009 | Hughes | ............... | B01D 15/163 |
| | | | | 250/282 |
| 2009/0309020 A1 | 12/2009 | Cooks et al. | | |
| 2010/0224013 A1* | 9/2010 | Van Berkel | ......... | H01J 49/0459 |
| | | | | 73/863.81 |
| 2010/0237235 A1* | 9/2010 | Ozbal | ................. | H01J 49/0431 |
| | | | | 250/282 |
| 2010/0237236 A1 | 9/2010 | Ozbal et al. | | |
| 2011/0133077 A1* | 6/2011 | Henion | .................. | G01N 1/405 |
| | | | | 250/288 |
| 2011/0220784 A1 | 9/2011 | Roach et al. | | |
| 2012/0053065 A1* | 3/2012 | Van Berkel | ......... | H01J 49/0431 |
| | | | | 506/7 |
| 2013/0043380 A1* | 2/2013 | Correale | ............. | G01N 1/2202 |
| | | | | 250/252.1 |
| 2013/0048861 A1 | 2/2013 | Kumano et al. | | |
| 2014/0117221 A1* | 5/2014 | Schneider | ........... | H01J 49/0468 |
| | | | | 250/282 |
| 2014/0326872 A1* | 11/2014 | Van Berkel | ............ | G01Q 70/08 |
| | | | | 250/288 |
| 2018/0158661 A1* | 6/2018 | Eberlin | ............... | H01J 49/0431 |
| 2018/0269047 A1* | 9/2018 | Zhu | ..................... | G01N 30/8665 |

OTHER PUBLICATIONS

Gary J. Van Berkel et al: "An open port sampling interface for liquid introduction atmospheric pressure ionization mass spectrometry: Open port sampling interface",Rapid Communications in Mass Spectrometry., vol. 29, No. 19, Oct. 15, 2015 (Oct. 15, 2015), pp. 1749-1756.

Gyorgy Vas et al: "Solid-phase microextraction: a powerful sample preparation tool prior to mass spectrometric analysis", Journal of Mass Spectrometry., vol. 39, No. 3, Mar. 2, 2004 (Mar. 2, 2004), pp. 233-254.

\* cited by examiner

FIG. 6

METHODS AND SYSTEMS FOR INCREASING SENSITIVITY OF DIRECT SAMPLING INTERFACES FOR MASS SPECTROMETRIC ANALYSIS

RELATED APPLICATIONS

This application claims the benefit of priority from U.S. Provisional Application Ser. No. 62/408,454, filed on Oct. 14, 2016, the entire contents of which are hereby incorporated by reference.

FIELD

The present teachings generally relate to mass spectrometry, and more particularly, to sampling interfaces for mass spectrometry systems and methods.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of the analyte of interest. Such pre-analytical steps can include sampling (i.e., sample collection) and sample preparation (separation from the matrix, concentration, fractionation and, if necessary, derivatization). It has been estimated, for example, that more than 80% of the time of overall analytical process can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation and sample introduction techniques for MS should be fast, reliable, reproducible, inexpensive, and in some aspects, amenable to automation. One recent example of an improved sample preparation technique is solid-phase microextraction (SPME), which essentially integrates sampling, sample preparation, and extraction into a single solvent-free step. Generally, SPME devices utilize a fiber or other surface (e.g., blades, micro-tips, pins, or mesh) coated with an extracting phase to which analytes within the sample can be preferentially adsorbed when the device is inserted into the sample. Because extraction can take place in situ by inserting a biocompatible device directly into tissue, blood, or other biological matrix for a short period of time, SPME does not require any sample collection. Alternatively, SPME devices can be used for ex vivo analysis using a small amount of a collected sample (i.e., a sample aliquot).

Though SPME is generally considered to be accurate and simple and can result in decreased sample preparation time and disposal costs, the mass-spectrometric based analysis of SPME-prepared samples may nonetheless require additional equipment and/or time-consuming steps in order to ionize the analyte from the SPME device directly or to desorb the analytes from the SPME device prior to ionization as required for mass spectrometry (MS). By way of example, various ionization methods have been developed that can desorb/ionize analytes from condensed-phase samples with minimal sample handling (e.g., desorption electrospray ionization (DESI) and direct analysis in real time (DART), which "wipe-off" analytes from the samples by exposing their surfaces to an ionizing medium such as a gas or an aerosol). However, such techniques can also require sophisticated and costly equipment, and may be amenable only for a limited class of highly-volatile small molecules.

Alternatively, additional desorption steps have been utilized to extract the analytes from the SPME device prior to ionization via ionization techniques other than DESI or DART. For example, because electrospray ionization (ESI) is one of the most common ionization methods and requires the analyte to be in solution, some users have utilized liquid desorption and subsequent purification/separation of the extracted/enriched analytes via high-performance liquid chromatography (HPLC) prior to MS analysis. However, liquid desorption prior to HPLC may require an extended processing step to transfer the analyte from the SPME coating to a relatively large volume liquid phase due to requirements imposed on the HPLC mobile phase (e.g., a weak solvent strength), can decrease throughput, introduce potential sources of error, increase dilution, and cannot be easily automated. Some groups have instead proposed substantial modifications to the standard electrospray ion source itself. Typically in ESI, a liquid sample is continuously discharged into an ionization chamber from within an electrically conductive capillary, while an electric potential difference between the capillary and a counter electrode generates a strong electric field within the ionization chamber that electrically charges the liquid sample. This electric field causes the liquid discharged from the capillary to disperse into a plurality of charged micro-droplets drawn toward the counter electrode if the charge imposed on the liquid's surface is strong enough to overcome the surface tension of the liquid (i.e., the particles attempt to disperse the charge and return to a lower energy state). As solvent within the micro-droplets evaporates during desolvation in the ionization chamber, charged analyte ions can then enter a sampling orifice of the counter electrode for subsequent mass spectrometric analysis. PCT Pub. No. WO2015188282 entitled "A Probe For Extraction Of Molecules Of Interest From A Sample," which is incorporated by reference herein in its entirety, for example, thus purports to provide for electrospray ionization from an SPME device by applying the ionizing electric potential to the conductive SPME device itself (to which a discrete amount of a desorption solution is applied) such that ions are generated directly from the edges of the wetted substrate.

There remains a need for improved and/or reduced-cost systems that enable fast-coupling of SPME devices to MS systems with minimal alterations to the front-end while maintaining sensitivity, simplicity, selectivity, speed and throughput.

SUMMARY

Methods and systems for delivering a liquid sample to an ion source for the generation of ions and subsequent analysis by mass spectrometry are provided herein. In accordance with various aspects of the present teachings, MS-based systems and methods are provided in which the flow of desorption solvent within a sampling probe fluidly coupled to an ion source can be selectively stopped such that the one or more analyte species desorbed from a sampling substrate (e.g., substrates having functionalized surfaces, an SPME substrate, surface-coated magnetic particles) are concentrated in a decreased volume of the desorption solvent that is subsequently delivered via one or more fluid pathways to the ion source, thereby decreasing dilution of the desorbed analytes and increasing the sensitivity of detection of the desorbed analytes. In various aspects, the analytes from the SPME device can be desorbed therefrom by increased concentration of desorption solvent and/or without a liquid chromatography (LC) column between the desorption sampling interface and the ion source. Additionally or alternatively, various aspects of the present teachings provide for the selective control of the flow rate of the desorption solvent within the sampling interface so as to enable additional processing steps (e.g., multiple samplings, reactions) within the sampling interface. In accordance with various aspects of the present teachings, desorption solvent can be continuously delivered to the ion source during the stopped-flow condition of the sampling interface so as to maintain the stability of the one or more pumping mechanisms and the ion spray source.

In accordance with various exemplary aspects of the present teachings, a system for analyzing a chemical composition of a specimen is provided, the system comprising a reservoir for storing a desorption solvent and a sampling probe having an open end at least partially defining a sample space configured to receive desorption solvent from the reservoir, the sample space being further configured to receive at a least a portion of a substrate having one or more analyte species adsorbed thereto such that at least a portion of said analyte species can be desorbed therefrom into the desorption solvent within the sample space. The system additionally includes a plurality of fluid pathways for delivering desorption solvent from the reservoir to an ion source and a fluid handling system alternately providing a first fluid pathway for flowing desorption solvent from said reservoir to said ion source via said sample space, and a second fluid pathway that bypasses said sample space while flowing the desorption solvent from said reservoir to said ion source. In some aspects, for example, the fluid handling system can comprise a valve movable between a first configuration and a second configuration, wherein in the first configuration the first fluid pathway is provided for flowing desorption solvent from the reservoir to the ion source via the sample space, and wherein in the second configuration the second fluid pathway is provided for flowing the desorption solvent from the reservoir to the ion source while bypassing the sample space. In certain aspects, the desorption solvent can be delivered to the ion source substantially continuously when the valve is in each of the first and second configuration. Additionally, in some aspects, the volumetric flow rate of the desorption solvent in the sample space is substantially zero in the second configuration. Moreover, in some aspects, the volumetric flow rate of the desorption solvent from the reservoir to the ion source is substantially zero for portions of time in the second configuration.

The valve can have a variety of configurations in accordance with the present teachings. By way of example, in some aspects the valve can comprise a first port fluidly coupled via a first fluid channel to an outlet of the reservoir; a second port fluidly coupled via a second fluid channel to an inlet end of the sampling probe; a third port fluidly coupled via a third fluid channel to an outlet end of the sampling probe; and a fourth port fluidly coupled via a fourth fluid channel to an inlet of the ion source. In some related aspects, the first fluid pathway can comprise the first, second, third, and fourth fluid channels and the second fluid pathway can comprise the first and fourth fluid channels. In various exemplary aspects, the valve can comprise first and second passages, wherein in the first configuration, the first passage fluidly couples the first and second ports and the second passage fluidly couples the third and fourth ports, and in the second configuration, the first and second passages can be actuated (e.g., rotated, manually or electrically under the control of a controller) such that the first passage fluidly couples the first and fourth ports and the second passage fluidly couples the second and third ports. Alternatively, in some aspects, the first passage fluidly couples the first and second ports and the second passage fluidly couples the third and fourth ports in the first configuration, and wherein in the second configuration, the first and second passages are actuated (e.g., rotated, manually or electrically under the control of a controller for example) such that the first passage fluidly couples the second and third ports and the second passage fluidly couples the first and fourth ports.

The sampling probe can have a variety of configurations. By way of example, in some exemplary aspects, the probe can comprise an outer capillary tube extending from a proximal end to a distal end and an inner capillary tube extending from a proximal end to a distal end and at least partially disposed within the outer capillary tube. In certain aspects, the distal end of the inner capillary tube can be recessed relative to the distal end of the outer capillary tube so as to define the sample space between the distal end of the inner capillary tube, a portion of an inner wall of the outer capillary tube, and the distal end of the outer capillary tube. Further, the inner and outer capillary tubes can define a desorption solvent conduit and a sampling conduit in fluid communication with one another via the sample space, the desorption solvent conduit extending from an inlet end configured to receive desorption solvent from the reservoir to an outlet end terminating at the sample space, and the sampling conduit extending from an inlet end commencing at said sample space for receiving from the sample space desorption solvent in which the desorbed analytes are entrained to an outlet end fluidly coupled to the ion source.

In some related aspects, an axial bore of the inner capillary tube at least partially defines the sampling conduit and a space between the inner capillary tube and the outer capillary tube defines the desorption solvent conduit, and further wherein the inlet end of the desorption solvent conduit is disposed in the first fluid pathway between the valve and the sample space and the outlet end of the sampling conduit is disposed in the first fluid pathway between the sample space and the valve.

In various aspects, the system can further comprise an ion source for discharging desorption solvent having the desorbed analytes entrained therein into an ionization chamber in fluid communication with a sampling orifice of a mass spectrometer.

In some aspects, the system can also comprise a controller for controlling movement of the valve between the first and second configurations, the controller configured to move the valve to the second configuration for insertion of the substrate within desorption solvent within the sample space. Additionally, the controller can effectuate the actuation of the valve so as to move the valve to the first configuration for flowing desorption solvent having analytes desorbed therein from the sample space to the ion source, wherein desorption solvent is delivered to the ion source substantially continuously when the switch is in each of the first and second configuration. In some related aspects, the system can further comprise one or more pumps for flowing desorption solvent through the first and second pathways, the controller configured to control the flow rate of desorption solvent delivered by the one or more pumps such that desorption solvent forms a dome-like surface profile at the open end when the valve is moved to the second configuration and a vortex-shaped surface at the open end when the valve is moved to the first configuration. In additional related aspects, the controller can be further configured to control the flow rate of desorption solvent delivered by the one or more pumps such that desorption solvent temporarily overflows from the sample space through the open end of the sampling probe when the valve is in the first configuration so as to at least one of clean the sampling probe and prevent sampling of airborne material before the substrate is inserted within the desorption solvent.

In accordance with various exemplary aspects of the present teachings, a method for analyzing a chemical composition of a specimen is provided, the method comprising inserting at least a portion of a substrate having one or more analytes adsorbed thereto (e.g., a SPME substrate having a surface coated with an extraction phase) into a desorption solvent contained within a sample space of a sampling probe for a first duration such that at least a portion of said absorbed analytes are desorbed from the coated surface into the desorption solvent, said sample space being partially defined by an open end of the sampling probe. In various aspects, the first duration can be in the range of from about 1 second to about 5 minutes, by way of non-limiting example. The method can further comprise directing a flow of the desorption solvent from a reservoir of the desorption solvent to an ion source while bypassing the sample space during at least a portion of said first duration such that the volumetric flow rate of the desorption solvent in the sample space is substantially zero. Thereafter, the flow of desorption solvent from the reservoir to the ion source can be re-directed via the sample space such that the analytes desorbed into the desorption solvent within the sample space are delivered to the ion source. The desorbed analytes entrained within the desorption solvent can then be ionized by the ion source for mass spectrometric analysis. In various aspects, a valve movable between a first configuration and a second configuration for directing the flow of desorption solvent through a plurality of fluid pathways is disposed between the reservoir and the sample space, and wherein re-directing the flow of desorption solvent from the reservoir to the ion source via the sample space comprises actuating the valve from the first configuration to the second configuration. In certain aspects, the desorption solvent can be delivered to the ion source substantially continuously when the valve is in each of the first and second configuration. Additionally, in some aspects, the volumetric flow rate of the desorption solvent in the sample space is substantially zero in the second configuration. In some related aspects, a first fluid pathway is provided for flowing desorption solvent from the reservoir to the ion source via the sample space and a second fluid pathway is provided for flowing the desorption solvent from the reservoir to the ion source and that bypasses the sample space.

In various aspects, the method can further comprise establishing the flow of the desorption solvent through the sample space prior to inserting said substrate within the sample space, wherein a flow rate of the desorption solvent within the sample space is configured to generate a dome-like surface profile of the desorption solvent at said open end when the substrate is inserted therein; and adjusting the flow rate of the desorption solvent within the sample space during said step of re-directing the flow of desorption solvent from the reservoir to the ion source via the sample space so as to generate a vortex-like surface profile of the desorption solvent at said open end. Additionally or alternatively, the method can include setting a flow rate of desorption within said sample space such that desorption solvent overflows from the sample space through the open end of the probe prior to inserting the substrate so as to at least one of clean the probe and prevent sampling of airborne material.

In various aspects of the present teachings, the method can further comprise adding one or more reagents to the sample space during said first duration for reacting with analytes that are at least one of adsorbed on the substrate and desorbed from the substrate.

In accordance with various exemplary aspects of the present teachings, a system for analyzing a chemical composition of a specimen is provided, the system comprising a reservoir for storing a desorption solvent and a sampling probe having an open end partially defining a sample space configured to receive desorption solvent from the reservoir, said sample space further configured to receive through the open end at a least a portion of a substrate having one or more analyte species adsorbed thereto such that at least a portion of said analyte species are desorbed therefrom into the desorption solvent within the sample space. The system can further comprise a fluid handling system comprising at least one pump and at least one fluid pathway for delivering desorption solvent from the reservoir to an ion source, wherein the fluid handling system is configured to terminate flow of desorption solvent within the sampling space during insertion of the sampling probe therein. In various aspects, a controller can be operatively coupled to the at least one pump and configured to control the volumetric flow rate of desorption solvent within the at least one pathway, the controller configured to turn off the pump during insertion of the sampling probe. Additionally or alternatively, in some aspects, the system can further comprise a source of nebulizer gas for providing a nebulizing gas flow surrounding the discharge end of the ion source, wherein the controller is operatively coupled to the source of nebulizer gas and is configured to terminate flow of desorption solvent within the sampling space during insertion of the sampling probe by terminating the flow of nebulizing gas provided to the discharge end of the ion source. In some exemplary aspects, the controller can also be configured to increase the volumetric flow rate of desorption solvent provided to the sampling space following withdrawal of a first substrate so as to deliver the desorption solvent having desorbed analytes entrained therein to the ion source. In various aspects, the controller can additionally or alternatively be configured to actuate the fluid handling system between a first configuration in which a first fluid pathway is provided for flowing desorption solvent from said reservoir to said ion source via said sample space, and a the second configuration in which a second fluid pathway is provided for flowing the desorption solvent from said reservoir to said ion source and that bypasses said sample space.

In accordance with various exemplary aspects of the present teachings, a system for analyzing a chemical composition of a specimen is described, which comprises: a reservoir for storing a delivery solvent; a sampling probe having an open end partially defining a sample space configured to receive delivery solvent from the reservoir, said sample space further configured to receive through the open end one or more liquid droplets having one or more analyte species contained therein such that the one or more liquid droplets is mixable with the delivery solvent within the sample space; a fluid handling system comprising at least one pump and at least one fluid pathway for delivering delivery solvent from the reservoir to an ion source, wherein the fluid handling system is configured to terminate flow of delivery solvent within the sampling space during insertion of the one or more liquid droplets into the sampling space.

In accordance with various exemplary aspects of the present teachings a method for chemical analysis is described which comprises: inserting one or more droplets of a liquid sample containing one or more analytes of interest into a delivery solvent contained within a sample space of a sampling probe for a first duration such that that the one or more droplets of the liquid sample are mixed with the delivery solvent, said sample space being partially defined by an open end of the sampling probe; directing a flow of the delivery solvent from a reservoir of the delivery solvent to an ion source while bypassing the sample space during at least a portion of said first duration such that the volumetric flow rate of the delivery solvent in the sample space is substantially zero; thereafter, re-directing the flow of delivery solvent from the reservoir to the ion source via said sample space such that said one or more droplets of the liquid sample that are mixed with the delivery solvent within the sample space are delivered to the ion source; and ionizing the one or more analytes of interest contained within the mixed delivery solvent and one or more droplets of liquid sample, for mass spectrometric analysis.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

In accordance with various aspects of the applicant's teachings, MS-based analytical systems and methods are provided herein in which the flow of desorption solvent within a sampling probe fluidly coupled to an ion source can be selectively controlled (e.g., stopped) such that one or more analyte species can be desorbed from a sample substrate inserted within the sampling probe within a decreased volume of desorption solvent for subsequently delivery to the ion source. In various aspects, sensitivity can be increased due to higher desorption efficiency (e.g., due to increased desorption time) and/or decreased dilution of the desorbed analytes. In various aspects, the analytes from the sample substrate can be desorbed directly therefrom without a liquid chromatography (LC) column between the desorption sampling interface and the ion source. Additionally or alternatively, various aspects of the present teachings provide for the selective control of the flow rate of the desorption solvent within the sampling interface so as to enable additional processing steps to occur within the sampling probe (e.g., multiple samplings, reactions). In accordance with various aspects of the present teachings, desorption solvent can be continuously delivered to the ion source during the stopped-flow condition of the sampling interface so as to maintain the stability of the one or more pumping mechanisms and the ion spray source.

Figure 1:
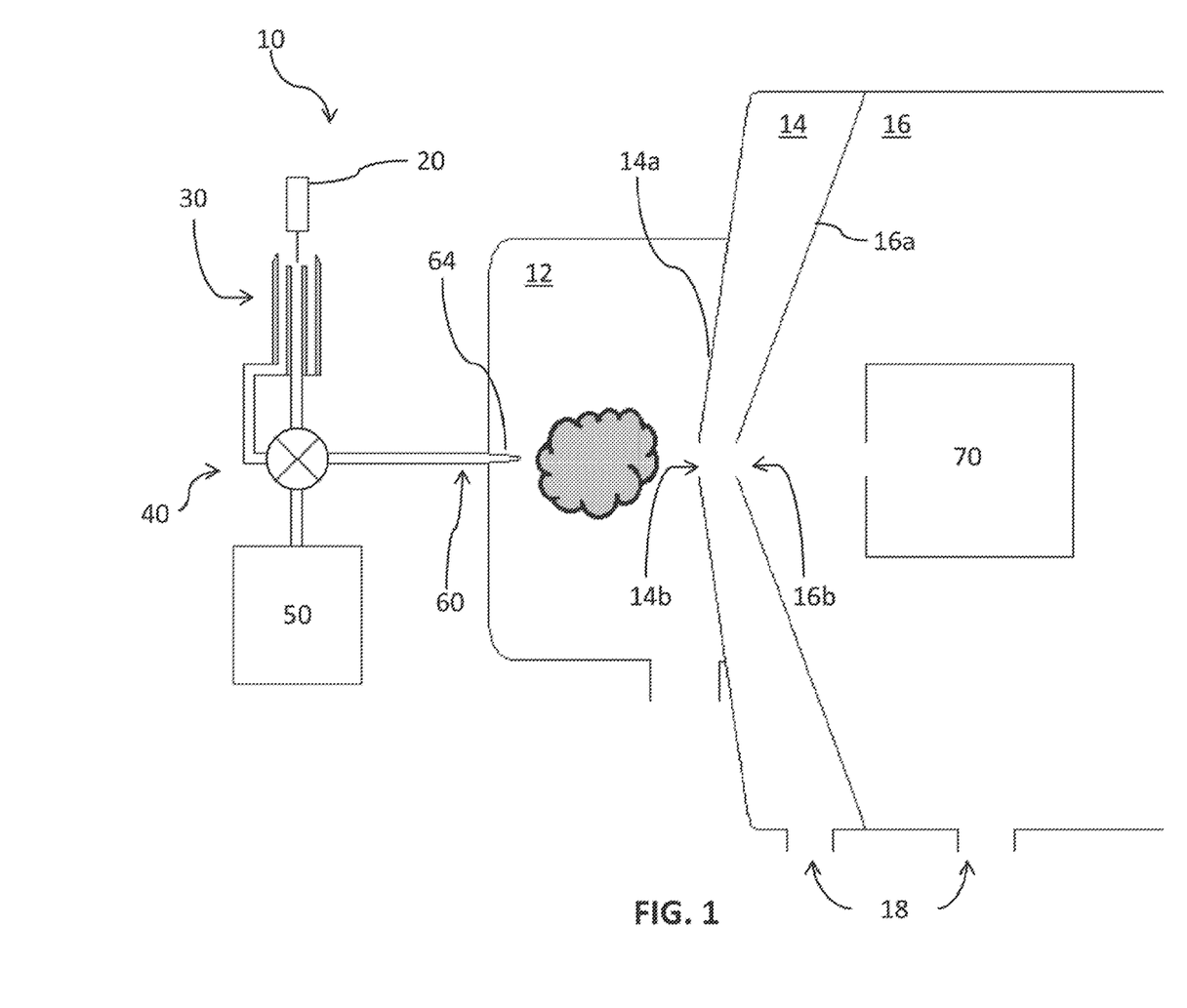
FIG. 1, in a schematic diagram, illustrates an exemplary system comprising a substrate sampling interface fluidly coupled to an electrospray ion source of a mass spectrometer system in accordance with various aspects of the applicant's teachings.

FIG. 1 schematically depicts an embodiment of an exemplary system 10 in accordance with various aspects of the applicant's teachings for ionizing and mass analyzing analytes adsorbed onto the surface of a sample substrate 20, the system including a fluid handling system 40 that alternately provides first and second fluid pathways for flowing desorption solvent from a reservoir 50 to an ion source 60 through a sampling probe 30 or while bypassing the sampling probe 30, respectively. As shown in FIG. 1, the exemplary system 10 generally includes a substrate sampling probe 30 (e.g., an open port probe) in fluid communication with an ion source 60 for discharging a liquid containing one or more sample analytes (e.g., via electrospray electrode 64) into an ionization chamber 12, and a mass analyzer 70 in fluid communication with the ionization chamber 12 for downstream processing and/or detection of ions generated by the ion source 60. The substrate sampling probe 30 can be generally configured to receive at least a portion of the substrate 20 (e.g., an SPME substrate) having a surface coated with an extraction phase to which one or more analytes from a sample are adsorbed and which is placed in a fluid pathway extending between a desorption solvent source 50, the substrate sampling probe 30, and the ion source 60. In this manner, analytes desorbed from the coated surface of the sample substrate 20 can flow within the desorption solvent to the ion source 40 for ionization thereby. As will be discussed in more detail below, the fluid handling system 40 generally comprises one or more fluidic conduits, valves, and/or pumps for controlling the flow of liquid (e.g., desorption solvent) between the reservoir 50, the sampling probe 30, and the ion source 60. In various aspects, the fluid handling system 40 can be operated (e.g., under the control of a controller, not shown) in a plurality of modes including a continuous flow mode in which desorption solvent flows from the reservoir 50 to the ion source 60 via the sampling probe 30 and a stopped-flow mode in which the desorption solvent from the reservoir 50 continues to be delivered to the ion source 60 while bypassing the sampling probe 30. In various aspects, the duration of the stopped-flow mode can be selected to occur during desorption of analytes from one or more substrates 20 and/or the addition of additional reagents to the sampling probe 30, all by way of non-limiting example.

The ion source 60 can have a variety of configurations but is generally configured to generate analytes contained within a liquid (e.g., the desorption solvent) that is received from the substrate sampling probe 30. In the exemplary embodiment depicted in FIG. 1, an electrospray electrode 64, which can comprise a capillary that is fluidly coupled to the substrate sampling probe 30, terminates in an outlet end that at least partially extends into the ionization chamber 12 and discharges the desorption solvent therein. As will be appreciated by a person skilled in the art in light of the present teachings, the outlet end of the electrospray electrode 64 can atomize, aerosolize, nebulize, or otherwise discharge (e.g., spray with a nozzle) the desorption solvent into the ionization chamber 12 to form a sample plume comprising a plurality of micro-droplets generally directed toward (e.g., in the vicinity of) the curtain plate aperture 14b and vacuum chamber sampling orifice 16b. As is known in the art, analytes contained within the micro-droplets can be ionized (i.e., charged) by the ion source 60, for example, as the sample plume is generated. By way of non-limiting example, the outlet end of the electrospray electrode 64 can be made of a conductive material and electrically coupled to a pole of a voltage source (not shown), while the other pole of the voltage source can be grounded. Micro-droplets contained within the sample plume can thus be charged by the voltage applied to the outlet end such that as the desorption solvent within the droplets evaporates during desolvation in the ionization chamber 12 such bare charged analyte ions are released and drawn toward and through the apertures 14b, 16b and focused (e.g., via one or more ion lens) into the mass analyzer 70. As discussed below, in some aspects of the present teaching, the desorption solvent can be continuously delivered to the ion source 60 during the stopped-flow condition of the sampling interface so as to maintain the stability of the one or more pumping mechanisms and the ion source 60. Though the ion source probe is generally described herein as an electrospray electrode 64, it should be appreciated that any number of different ionization techniques known in the art for ionizing liquid samples and modified in accordance with the present teachings can be utilized as the ion source 60. By way of non-limiting example, the ion source 60 can be an electrospray ionization device, a nebulizer assisted electrospray device, a chemical ionization device, a nebulizer assisted atomization device, a photoionization device, a laser ionization device, a thermospray ionization device, or a sonic spray ionization device. It will be appreciated that in some aspects, the ion source 60 can optionally include a source of pressurized gas (e.g. nitrogen, air, or noble gas) that supplies a high velocity nebulizing gas flow which surrounds the outlet end of the electrospray electrode 64 and interacts with the fluid discharged therefrom to enhance the formation of the sample plume and the ion release within the plume for sampling by 14b and 16b, e.g., via the interaction of the high speed nebulizing flow and jet of liquid sample. The nebulizer gas can be supplied at a variety of flow rates, for example, in a range from about 0.1 L/min to about 20 L/min.

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes desorbed from the substrate 20 can be ionized as the desorption solvent is discharged from the electrospray electrode 64, is separated from a gas curtain chamber 14 by a plate 14a having a curtain plate aperture 14b. As shown, a vacuum chamber 16, which houses the mass analyzer 70, is separated from the curtain chamber 14 by a plate 16a having a vacuum chamber sampling orifice 16b. The curtain chamber 14 and vacuum chamber 16 can be maintained at a selected pressure (s) (e.g., the same or different sub-atmospheric pressures, a pressure lower than the ionization chamber) by evacuation through one or more vacuum pump ports 18.

It will also be appreciated by a person skilled in the art and in light of the teachings herein that the mass analyzer 70 can have a variety of configurations. Generally, the mass analyzer 70 is configured to process (e.g., filter, sort, dissociate, detect, etc.) sample ions generated by the ion source 60. By way of non-limiting example, the mass analyzer 70 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-$Q_{linear}$ ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance other suitable mass spectrometers include single quadrupole, triple quadrupole, ToF, trap, and hybrid analyzers. It will further be appreciated that any number of additional elements can be included in the system 10 including, for example, an ion mobility spectrometer (e.g., a differential mobility spectrometer) that is disposed between the ionization chamber 12 and the mass analyzer 70 and is configured to separate ions based on their mobility through a drift gas in high- and low-fields rather than their mass-to-charge ratio). Additionally, it will be appreciated that the mass analyzer 70 can comprise a detector that can detect the ions which pass through the analyzer 70 and can, for example, supply a signal indicative of the number of ions per second that are detected.

Figure 2:
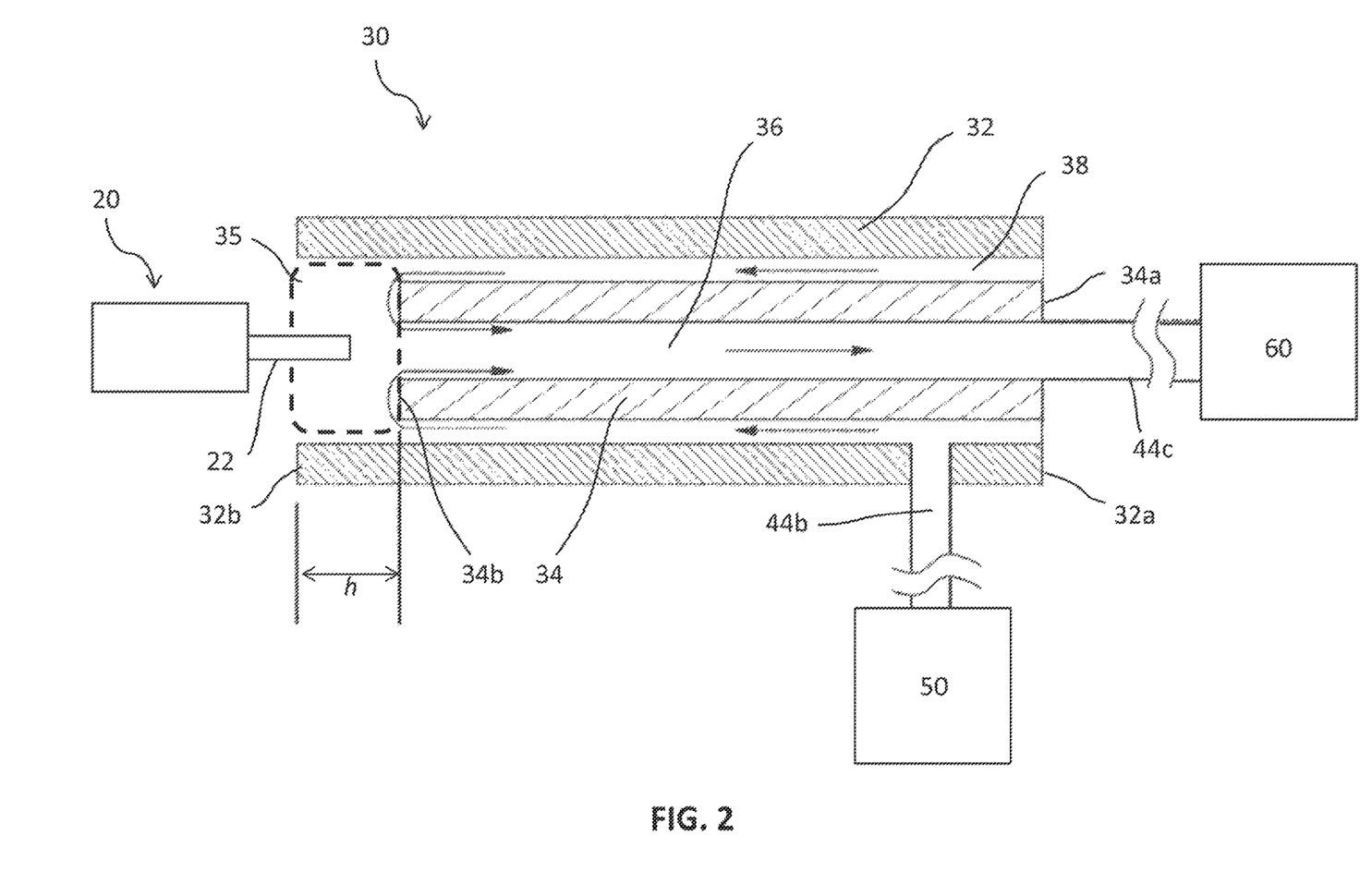
FIG. 2, in a schematic diagram, illustrates the exemplary substrate sampling interface of FIG. 1 in additional detail, in accordance with various aspects of the applicant's teachings.

With reference now to FIG. 2, an exemplary substrate sampling probe 30 (e.g., an open port probe) for desorbing one or more analytes from a SPME substrate 20 and suitable for use in the system of FIG. 1 is schematically depicted. Other non-limiting, exemplary sampling substrates that can be modified in accordance various aspects of the systems, devices, and methods disclosed herein can be found, for example, in an article entitled "An open port sampling interface for liquid introduction atmospheric pressure ionization mass spectrometry," authored by van Berkel et al.

and published in Rapid Communication in Mass Spectrometry 29(19), 1749-1756, which is incorporated by reference in its entirety. As shown, the substrate sampling probe 30 is generally disposed between the reservoir 50 and ion source 60 and provides a fluid pathway therebetween such that analytes entrained within desorption solvent that is provided by the reservoir 50 can be delivered to and ionized by the ion source 60. The sampling probe 30 can have a variety of configurations for sampling desorbed analytes from a substrate, but in the depicted exemplary configuration includes an outer tube (e.g., outer capillary tube 32) extending from a proximal end 32a to a distal end 32b and an inner tube (e.g., inner capillary tube 34) disposed co-axially within the outer capillary tube 32. As shown, the inner capillary tube 34 also extends from a proximal end 34a to a distal end 34b. The inner capillary tube 34 comprises an axial bore providing a fluid channel therethrough, which as shown in the exemplary embodiment of FIG. 2 defines a sampling conduit 36 through which liquid can be transmitted from the substrate sampling probe 30 to the ion source 40 of FIG. 1 via the probe outlet conduit 44c (i.e., the sampling conduit 36 can be fluidly coupled to the inner bore of the electrospray electrode 64 via the fluid handling system 40). On the other hand, the annular space between the inner surface of the outer capillary tube 32 and the outer surface of the inner capillary tube 34 can define a desorption solvent conduit 38 extending from an inlet end coupled to the desorption solvent source 50 (e.g., via the probe inlet conduit 44b) to an outlet end (adjacent the distal end 34b of the inner capillary tube 34). In some exemplary aspects of the present teachings, the distal end 34b of the inner capillary tube 34 can be recessed relative to the distal end 32b of the outer capillary tube 32 (e.g., by a distance h as shown in FIG. 2) so as to define a distal fluid chamber 35 of the substrate sampling probe 30 that extends between and is defined by the distal end 34b of the inner capillary 34 and the distal end 32b of the outer capillary tube 32. Thus, the distal fluid chamber 35 represents the space adapted to contain fluid between the open distal end of the substrate sampling probe 30 and the distal end 34b of the inner capillary tube 34. Further, as indicated by the arrows of FIG. 2 within the sampling probe 30, the desorption solvent conduit 38 is in fluid communication with the sampling capillary 36 via this distal fluid chamber 35. In this manner and depending on the fluid flow rates of the respective channels, fluid that is delivered to the distal fluid chamber 35 through the desorption solvent conduit 38 can enter the inlet end of the sampling conduit 36 for transmission to its outlet end and subsequently to the ion source 60. It should be appreciated that though the inner capillary tube 34 is described above and shown in FIG. 2 as defining the sampling conduit 36 and the annular space between the inner capillary tube 34 and the outer capillary tube 32 defines the desorption solvent conduit 38, the conduit defined by the inner capillary tube 34 can instead be coupled to the desorption solvent source 50 (so as to define the desorption solvent conduit) and the annular space between the inner and outer capillaries 34, 32 can be coupled to the ion source 60 (so as to define the sampling conduit).

As shown in FIG. 2, the desorption solvent source 50 can be fluidly coupled to the desorption solvent conduit 38 via a supply conduit 44b through which desorption solvent can be delivered at a selected volumetric rate (e.g., via one or more pumping mechanisms including reciprocating pumps, positive displacement pumps such as rotary, gear, plunger, piston, peristaltic, diaphragm pump, and other pumps such as gravity, impulse and centrifugal pumps can be used to pump liquid sample), all by way of non-limiting example. Any desorption solvent effective to desorb analytes from a substrate 20 (e.g., a SPME device) and amenable to the ionization process is suitable for use in the present teachings. Similarly, it will be appreciated that one or more pumping mechanisms can be provided for controlling the volumetric flow rate through the sampling conduit 36 and/or the electrospray electrode of the ion source 60, the volumetric flow rates selected to be the same or different from one another and the volumetric flow rate of the desorption solvent through the desorption solvent conduit 38. As discussed in detail below with reference to FIG. 4, in some aspects, these different volumetric flow rates through the various channels of the substrate sampling probe 30 and/or the electrospray electrode 44 can be independently adjusted (e.g., by adjusting the flow rate of a nebulizer gas surrounding the discharge end of the electrospray electrode) so as to control the movement of fluid throughout the system 10 and/or the surface shape of the desorption solvent at the open end of the sampling probe 30. By way of non-limiting example, the volumetric flow rate through the desorption solvent conduit 38 can be temporarily increased relative to the volumetric flow rate through the sampling conduit 36 such that the fluid in the distal fluid chamber 35 overflows from the open end of the substrate sampling probe 30 to clean any residual sample deposited by the withdrawn substrate and/or to prevent any airborne material from being transmitted into the sampling conduit 36 (e.g., after withdrawal of a substrate, before the insertion of another substrate). In various aspects, the volumetric flow rate of desorption solvent into and within the sampling probe 30 can be stopped upon insertion of the substrate so as to concentrate the desorbed analytes in a smaller volume of desorption solvent, as discussed otherwise herein.

As shown in FIG. 2, an exemplary SPME substrate 20 having a coated surface 22 to which analytes can be adsorbed, as described, for example, PCT Pub. No. WO2015188282 entitled "A Probe for Extraction of Molecules of Interest from a Sample," the teachings of which are hereby incorporated by reference in its entirety, is schematically depicted as being inserted through the open end of the substrate sampling probe 30 such that the coated surface 22 is at least partially disposed in the desorption solvent (e.g., the desorption solvent within the distal fluid chamber 35). As shown in FIG. 2, by way of non-limiting example, the exemplary substrate 20 can comprise an extended surface 22 upon which a SPME extraction phase (e.g., layer) has been coated and to which one or more analytes of interest can be adsorbed during extraction from a sample. Upon the coated surface 22 being inserted into the distal fluid chamber 35, the desorption solvent within the distal fluid chamber 35 can be effective to desorb at least a portion of the one or more analytes adsorbed on the coated surface 22 such that the desorbed analytes can flow with the desorption solvent into the inlet of the sampling conduit 36. Substrates for use in systems and methods in accordance with the present teachings are generally able to be at least partially inserted into a fluid pathway provided by a substrate sampling probe 30 such that the desorption solvent provided thereby is effective to desorb one or more analytes of interest from the substrate, though the substrate configuration (e.g., particles, fibers, blades, micro-tips, pins, or mesh) and/or coating (e.g., HLB-PAN, C18-PAN, antibodies, etc.) is not particularly limited. Indeed, any known substrate and coating chemistries known in the art or hereafter developed and modified in accordance with the present teachings can be used in the methods and systems disclosed herein. Other exemplary SPME devices suitable for use in accordance with various aspects of the present teachings are described, for example, in U.S. Pat. No. 5,691,205, entitled "Method and Devise for Solid Phase Microextraction and Desorption," the teachings of which are hereby incorporated by reference in their entireties.

It will be appreciated that substrate sampling probes in accordance with the present teachings can also have a variety of configuration and sizes, with the substrate sampling probe 30 of FIG. 2 representing an exemplary depiction. By way of non-limiting example, the dimensions of an inner diameter of the inner capillary tube 34 can be in a range from about 1 micron to about 1 mm (e.g., 200 microns), with exemplary dimensions of the outer diameter of the inner capillary tube 34 being in a range from about 100 microns to about 3 or 4 centimeters (e.g., 360 microns). Also by way of example, the dimensions of the inner diameter of the outer capillary tube 32 can be in a range from about 100 microns to about 3 or 4 centimeters (e.g., 450 microns), with the typical dimensions of the outer diameter of the outer capillary tube 32 being in a range from about 150 microns to about 3 or 4 centimeters (e.g., 950 microns). The cross-sectional shapes of the inner capillary tube 34 and/or the outer capillary tube 32 can be circular, elliptical, superelliptical (i.e., shaped like a superellipse), or even polygonal (e.g., square). Additional details regarding SPME sampling probes suitable for use in the system of FIG. 1 and modified in accordance with the present teachings can be found, for example, in U.S. Pub. No. 20130294971 entitled "Surface Sampling Concentration and Reaction Probe" and U.S. Pub. No. 20140216177 entitled "Method and System for Formation and Withdrawal of a Sample From a Surface to be Analyzed" the teaching of which are hereby incorporated by reference in their entireties.

Figure 3A:
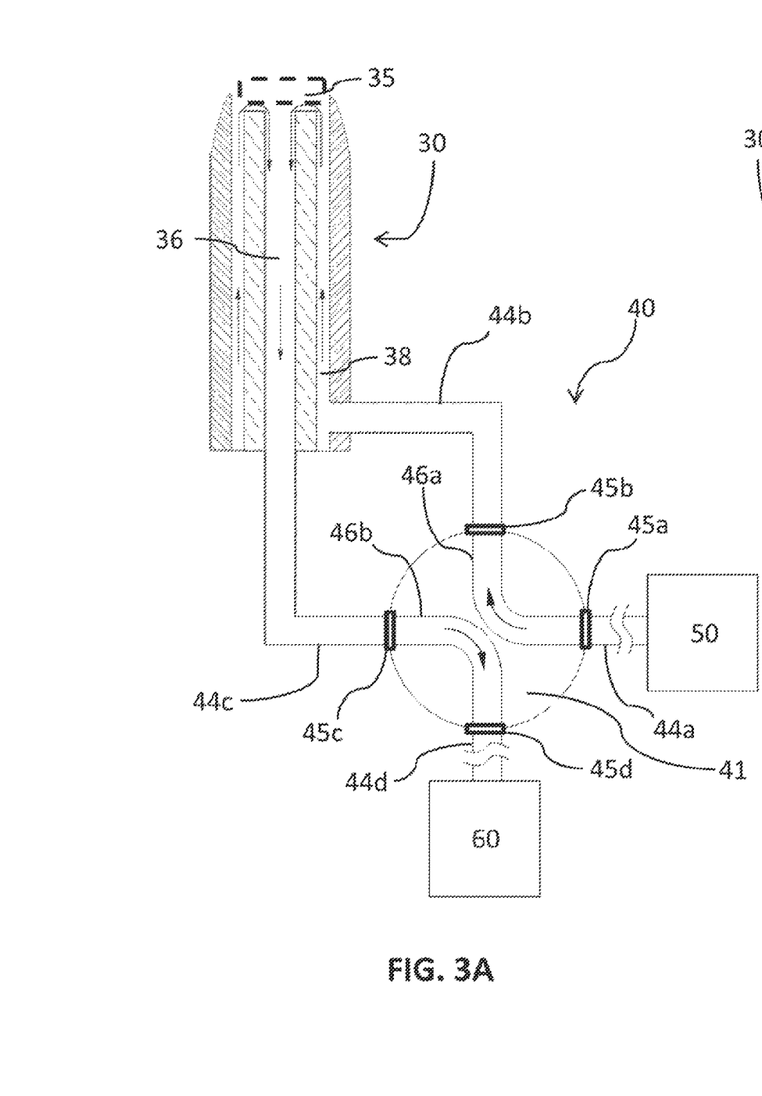
FIGS. 3A-B schematically depict an exemplary sampling probe for use in the system of FIG. 1, the sampling probe being operated in a first, continuous flow mode and a second, stopped flow mode, respectively, in accordance with various aspects of the present teachings.
Figure 3B:
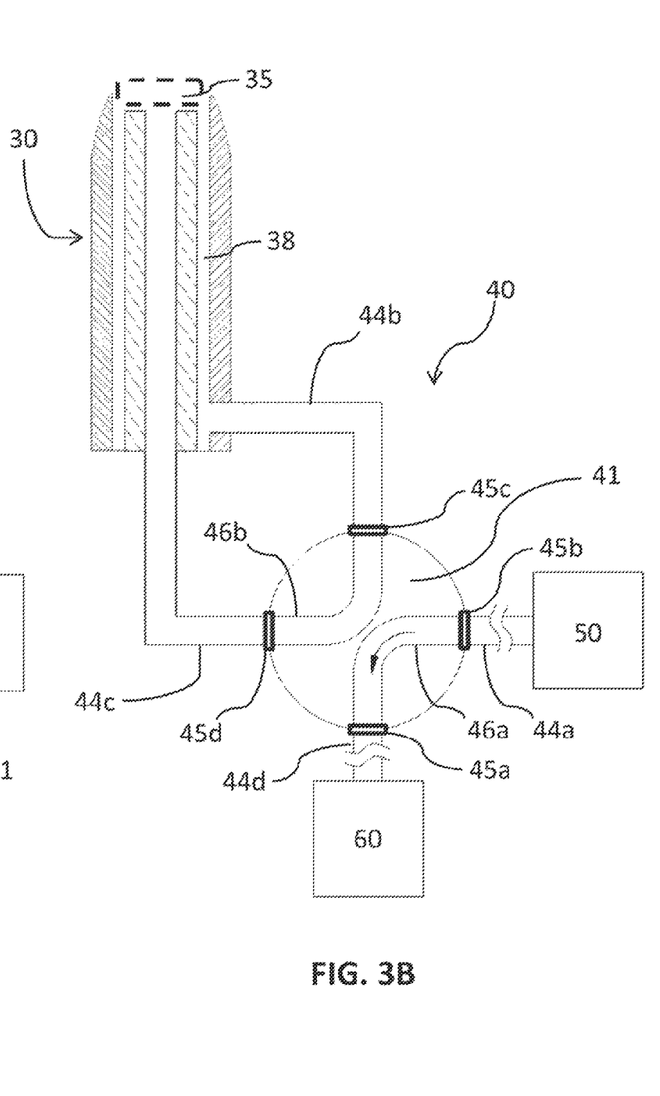

With reference now to FIGS. 3A and 3B, an exemplary fluid handling system 40 in accordance with various aspects of the present teachings is depicted in additional detail. As shown, the fluid handling system 40 comprises a valve 41 fluidly coupled to the reservoir 50, the sampling probe 30, and the ion source 60. It will be appreciated by a person skilled in the art that a pump (not shown) can additionally be provided so as to control the flow of fluid through the fluid handling system 40 as otherwise discussed herein. In the depicted fluid handling system 40, the valve 41 comprises a four-way valve having a plurality of passages 46a,b that can be selectively coupled to the various inlets and outlets of the components of the system 10 in accordance with various aspects of the present teachings. In particular, the valve 41 in a first configuration can provide a continuous fluid pathway from the reservoir 50 to the ion source 60 via the sample space 35 of the sampling probe 30 (FIG. 3A) and in a second configuration can provide a fluid pathway such that desorption solvent flows directly from the reservoir 50 to the ion source 60 while bypassing the sampling probe 30 (e.g., without the desorption solvent being delivered to the sample space 35) (FIG. 3B). It will be appreciated that actuating the valve 41 from the configuration of FIG. 3A to that of FIG. 3B, fluidly isolates the sampling probe 30 from the reservoir 50 and ion source 60 such that the flow of desorption solvent within the sampling probe 30 would be substantially stopped. Nonetheless, the flow of fluid to the ion source 60 can continue while the valve is in stopped-flow configuration as shown in FIG. 3B, for example, at substantially the same volumetric flow rate as in the configuration of FIG. 3A, thereby maintaining the stability of the ion source 60 (e.g., the ion source does not need to be re-equilibrated following a dry condition).

As shown in the exemplary depiction of FIGS. 3A and 3B, the valve 41 can include a plurality of passages 46a,b, each of which is fluidly coupled to a fluid channel 44a-d via a port 45a-d. For example, in the continuous flow mode configuration of FIG. 3A, valve 41 provides a fluid passage 46a extending between the outlet channel 44a of the reservoir 50 and the inlet channel 44b of the sampling probe 30 so as to provide desorption solvent to the desorption solvent conduit 38. After being flowed through the sample space 35 and the sampling conduit 36, the desorption solvent can then be transferred to the ion source 60 via the probe outlet channel 44c, the passage 46b within the valve 41, and the ion source inlet channel 44d. In accordance with various aspects of the present teachings, the fluid pathways in the fluid handling system 40 can be re-configured (e.g., during a step of desorption of analyte(s) from one or more substrates) to the stopped-flow mode configuration shown in FIG. 3B by actuating the valve 41 (e.g., manually or electrically under the control of a controller). As depicted in FIG. 3B, for example, the passages 46a,b and ports 45a-d have been rotated 90° clockwise relative to the configuration shown in FIG. 3A such that the passage 46a directly connects the outlet channel 44a of the reservoir 50 and the ion source inlet channel 44d (thereby bypassing the sampling probe 30), while passage 46b connects the inlet and outlet channels 44b,c of the sampling probe 30, thus forming a closed circuit within the sampling probe 30 having substantially no fluid flow.

Figure 4A:
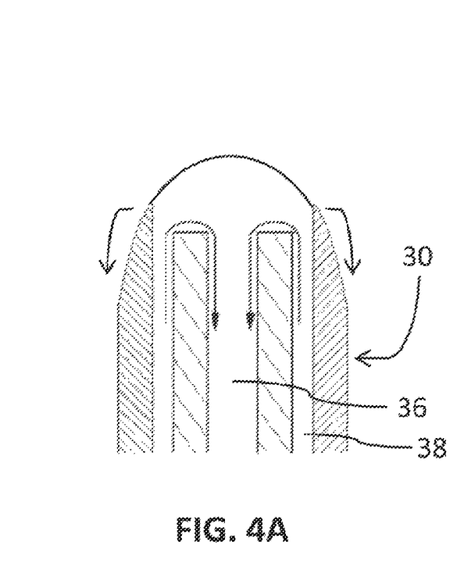
FIGS. 4A-4D schematically depict exemplary surface shapes of the desorption solvent in the sample space during the continuous flow mode and the second stopped flow mode, in accordance with various aspects of the present teachings.
Figure 4B:
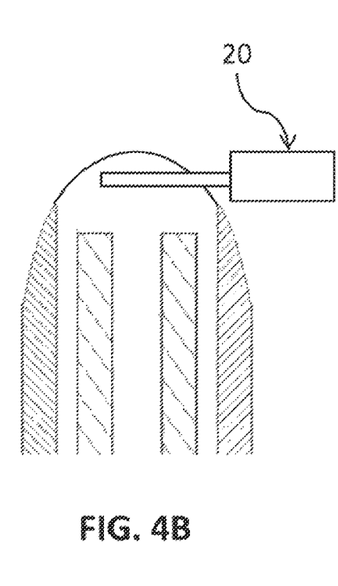
Figure 4C:
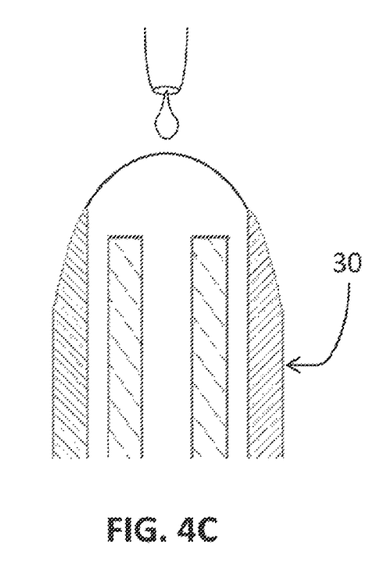
Figure 4D:
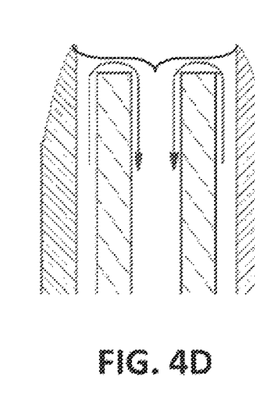

With reference now to FIGS. 4A-D, these figures schematically represent various conditions of the fluid flow within the sampling probe 30 that can be generated before, during, and after the sampling methods described herein. As shown in FIG. 4A, for example, prior to inserting a substrate into the sampling space 35, the volumetric flow rate through the desorption solvent conduit 38 can be temporarily increased relative to the volumetric flow rate through the sampling conduit 36 such that the fluid in the distal fluid chamber 35 overflows from the open end of the substrate sampling probe 30 to clean any residual sample deposited by a previously-inserted substrate and/or to prevent any airborne material from being transmitted into the sampling conduit 36 (e.g., after withdrawal of a substrate, before the insertion of another substrate). With reference now to FIG. 4B, a temporarily higher flow rate can also be used to generate a dome-shaped surface profile at the open end such that, when the flow of fluid is within the sampling probe 30 is stopped as otherwise discussed herein, the substrate 20 can be inserted into the desorption solvent in a direction generally perpendicular to the axis of the sampling probe 30a. In this manner, a larger area for contact with the surface to which analytes are adsorbed is provided, which can thereby increase the desorption efficiency. With reference now to FIG. 4C, the sampling space 35 of the sampling probe 30 can also be utilized in various aspects to react analytes with various reagents added to the sampling space 35 during the stopped-flow mode. By way of example, before, during, or after desorption of the analytes from a substrate, one or more reagents can be added to the sampling space 35 so as to react with analytes adsorbed to the substrate 20 and/or previously desorbed therefrom that remain in the sample space. Alternatively or additionally, a plurality of substrates can be inserted within the sampling space during a single duration of the stopped-flow mode such that analytes from multiple substrates can be desorbed into substantially the same volume of desorption solvent within the sample space 35. In other embodiments, the reagent itself may contain an analyte of interest to be analyzed. In such cases, droplets may be dispensed into the sampling probe to be detected independent of whether a desorbed analyte has previously, or will be present within the sampling space. With reference now to FIG. 4D, following desorption in the stopped-flow mode (as in FIG. 4B) or reaction within the sampling space (as in FIG. 4C), the fluid handling system 40 can be switched back to its continuous flow mode configuration such that the analytes that were desorbed into the desorption solvent within the sampling space 35 are delivered to the ion source as flow within the sampling probe is re-commenced. In certain aspects, a lower desorption solvent flow rate can be temporarily selected, thereby creating a vortex-like surface profile at the sampling probe's open end and resulting in increased sensitivity and/or sharper peak shape of the MS-based analysis.

Figure 5:
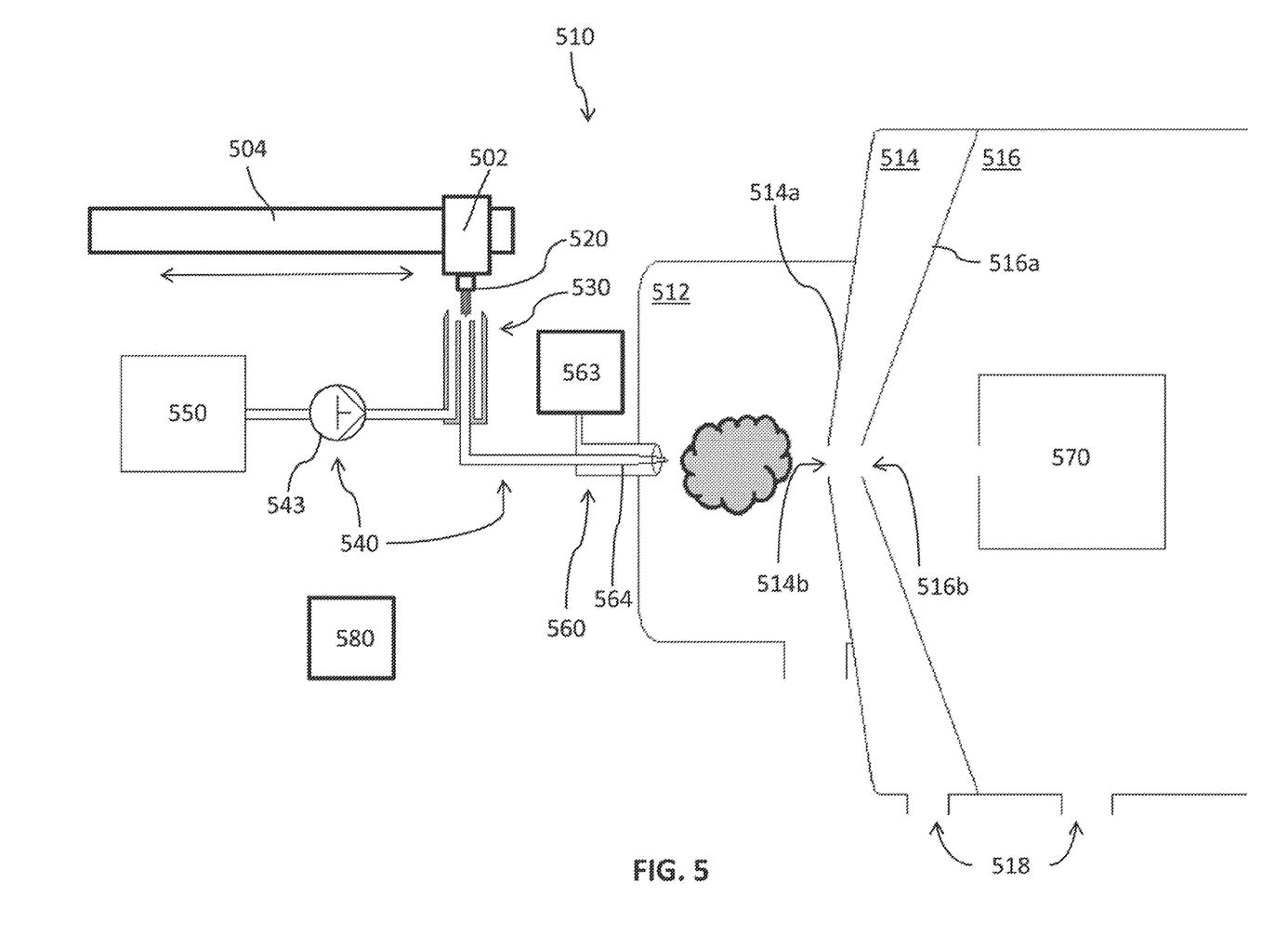
FIG. 5 depicts in schematic diagram an exemplary automated system for sample analysis in accordance with various aspects of the applicant's present teachings.

With reference now to FIG. 5, another exemplary sample analysis system 510 in accordance with various aspects of the present teachings is depicted. System 510 is similar to that discussed above with reference to FIGS. 1-4 in that it includes a reservoir 550 that can be fluidly coupled via a fluid handling system 540 to a sampling probe 530 and an ion source 560 so as to generate ions from analytes desorbed from a sample substrate 520 for analysis by the mass analyzer 570. As discussed otherwise herein, the fluid handling system 540 can be configured to terminate the flow of desorption solvent within the sampling space during insertion of the sampling probe 520 therein.

As shown in FIG. 5, the exemplary system 510 can be automated (e.g., under the control of a controller 580) and can include an actuation mechanism 504 (e.g., robotic arm, stage, electromechanical translator, step motor, etc.) that is coupled to a sample holder 502 so as to grip, hold, or otherwise couple to a the sampling substrate 520. One exemplary robotic system suitable for use in accordance with the present teachings is the Concept-96 autosampler marketed by PAS Technologies). Under the control of the controller 580 (e.g., without human intervention), for example, the actuation mechanism 504 can be configured to transfer the substrate 520 through a complete sample preparation workflow including, for example, conditioning the substrate (e.g., coating or otherwise functionalizing the surface to enable extraction of an analyte of interest), extraction/enrichment of the analytes from the sample (e.g., by immersing the coated surface in the sample, with or without vortexing), rinsing the extracted sample (e.g., by immersing the substrate 520 having analytes adsorbed thereto in H$_2$O so as to remove some interfering molecules, salts, proteins, etc.), and inserting the rinsed substrate 520 within the sampling space of the substrate sampling probe 530. As discussed otherwise herein, the substrate sampling probe 530 is configured to desorb analytes from the substrate 520 utilizing the desorption solvent provided from the reservoir 550, with the desorbed analytes being entrained within the desorption solvent to the ion source 560/mass analyzer 570 for ionization/mass spectrometric analysis.

As shown in FIG. 5, the exemplary fluid handling system 540 can comprise a pump 543 configured to pump desorption solvent from the reservoir 550 to the sampling space of the probe 530. In various aspects, the pump 543 can be operatively coupled to the controller 580 such that the volumetric flow rate of the desorption solvent from the reservoir to the sampling probe 530 (and within the sampling space) can be adjusted based on one or more signals provided by the controller 580. By way of example, the controller 580 can be configured to terminate the flow of desorption solvent by the pump 543 upon insertion of the sample substrate 520 within the sample space. Additionally or alternatively, the controller can be configured to increase the volumetric flow rate of desorption solvent to the sampling space after removal of a sampling substrate 520 therefrom so as to temporarily overflow desorption solvent through the open end of the sampling probe 530 before another substrate 520 is inserted therein by the actuation mechanism 502.

As noted above, the system 510 is also shown to include a source 563 of pressurized gas (e.g. nitrogen, air, or noble gas) that supplies a high velocity nebulizing gas flow which surrounds the outlet end of the electrospray electrode 564 and interacts with the fluid discharged therefrom to enhance the formation of the sample plume and the ion release within the plume for sampling by 514b and 516b, e.g., via the interaction of the high speed nebulizing flow and jet of liquid sample. The nebulizer gas can be supplied at a variety of flow rates, for example, in a range from about 0.1 L/min to about 20 L/min, which can also be controlled under the influence of controller 580. In accordance with various aspects of the present teachings, it will be appreciated that the flow rate of the nebulizer gas can be adjusted (e.g., under the influence of controller 580) such that the flow rate of desorption solvent from the sampling space (e.g., via sampling conduit 36 of FIG. 2) can be adjusted based, for example, on suction generated by the interaction of the nebulizer gas and the desorption solvent as it is being discharged from the electrospray electrode 564 (e.g., due to the Venturi effect). In this manner, the controller 580 can additionally or alternatively control the flow rate of the desorption solvent through the sampling probe in accordance with various aspects of the present teachings by adjusting one or more of a pump and/or valve for controlling the flow rate of the nebulizer gas. By way of non-limiting example, the controller 580 can be configured to terminate the flow of desorption solvent provided by the pump 543 and/or the flow of nebulizer gas provided from the nebulizer source 563 (e.g., via one or more valves) so as to substantially terminate the flow of desorption solvent within the sampling space during insertion of the substrate 520 therein.

The ionization chamber 512, within which analytes desorbed from the substrate 520 can be ionized as the desorption solvent is discharged from the electrospray electrode 564, is separated from a gas curtain chamber 514 by a plate 514a having a curtain plate aperture 514b. As shown, a vacuum chamber 516, which houses the mass analyzer 570, is separated from the curtain chamber 514 by a plate 516a having a vacuum chamber sampling orifice 516b. The curtain chamber 514 and vacuum chamber 516 can be maintained at a selected pressure(s) (e.g., the same or different sub-atmospheric pressures, a pressure lower than the ionization chamber) by evacuation through one or more vacuum pump ports 518.

Figure 6:
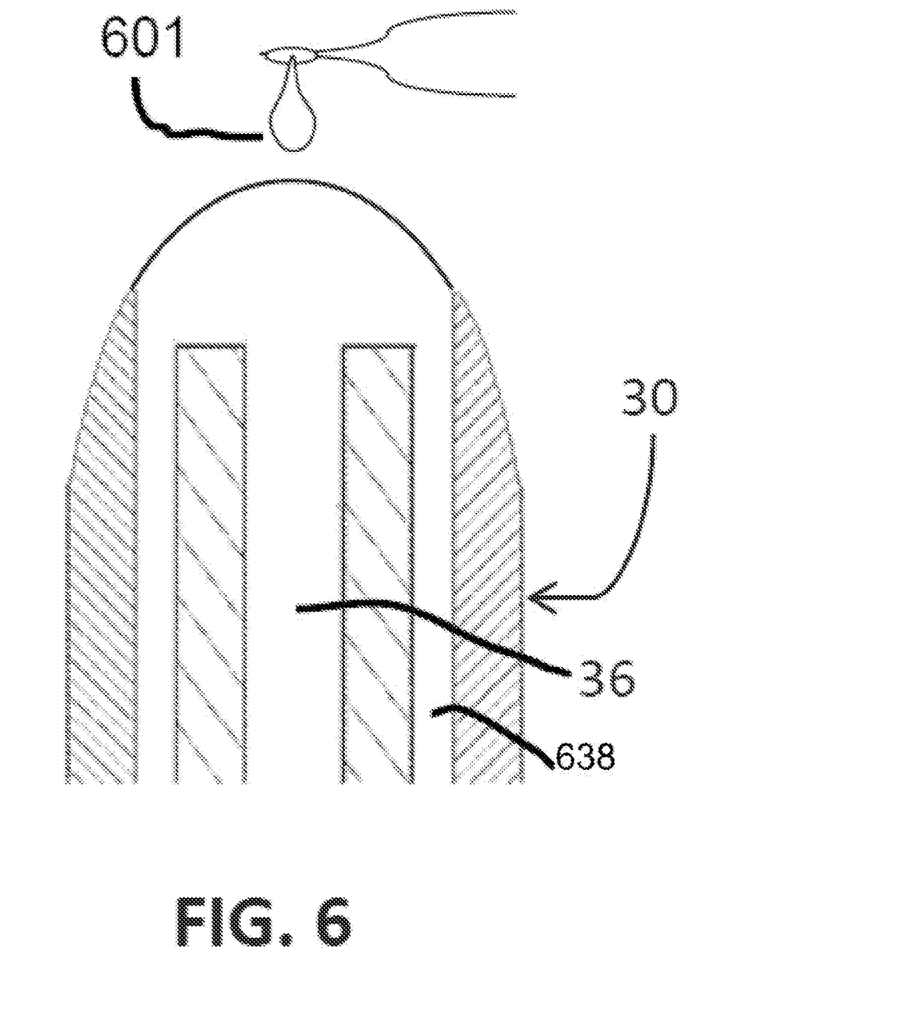
FIG. 6 depicts in schematic diagram an exemplary embodiment of a sampling probe for use in the system of FIG. 1 in which droplets of a sample liquid are deposited into a delivery solvent.

Now referring to FIG. 6, another embodiment is depicted of the present teachings in which no sampling substrate is utilized. In this embodiment, one or more analytes of interest are contained within a liquid sample 601, and one or more droplets of the liquid sample containing the one or more analytes of interest are deposited into the sampling probe. In such embodiments, the apparatus is similar to that which has been described previously for use with the sampling substrate with the exception that the desorption solvent contained within the conduit 38 which is not involving in a desorbing an analyte from a substrate is characterized as a delivery solvent travelling in a delivery solvent conduit 638. In such cases, the valve functions in a similar fashion in which when operating in the second configuration, the one or more analytes contained within the one or more droplets can be allowed to concentrate in the sampling probe before the valve is switched to the first configuration which allows the analytes to be transferred to the ion source and for analysis.

It will be appreciated in light of the present teachings that the exemplary methods and systems described can be utilized in an automated protocol and can reduce and/or eliminate the need for complex and time-consuming sample preparation steps such as liquid chromatography. In accordance with various aspects of the present teachings, an actuation mechanism (e.g., robotic arm, stage, electromechanical translator, step motor, etc.) can be utilized to deliver under the control of a controller (not shown) and without human intervention one or more substrates to the sampling space of the sampling probe, timed for example to coincide with the configuration of the fluid handling system 40 as described otherwise herein so as to increase the desorption efficiency and/or sensitivity of the analytes that were adsorbed onto the surface of the sample substrate 20.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. A system for analyzing a chemical composition of a specimen, comprising: a reservoir for storing a desorption solvent;
   a sampling probe having an open end partially defining a sample space configured to receive desorption solvent from the reservoir, said sample space further configured to receive through the open end at a least a portion of a substrate having one or more analyte species adsorbed thereto such that at least a portion of said analyte species are desorbed therefrom into the desorption solvent within the sample space;
   a plurality of fluid pathways for delivering desorption solvent from the reservoir to an ion source; and
   a valve movable between a first configuration and a second configuration, wherein in the first configuration a first fluid pathway is provided for flowing desorption solvent from said reservoir to said ion source via said sample space, and wherein in the second configuration a second fluid pathway is provided for flowing the desorption solvent from said reservoir to said ion source and that bypasses said sample space.

2. The system of claim 1, wherein desorption solvent is delivered to the ion source substantially continuously when the valve is in each of the first and second configuration.

3. The system of claim 1, wherein in the second configuration, the volumetric flow rate of the desorption solvent in the sample space is substantially zero.

4. The system of claim 1, wherein the valve comprises:
   a first port fluidly coupled via a first fluid channel to an outlet of the reservoir;
   a second port fluidly coupled via a second fluid channel to an inlet end of the sampling probe;
   a third port fluidly coupled via a third fluid channel to an outlet end of the sampling probe; and
   a fourth port fluidly coupled via a fourth fluid channel to an inlet of the ion source.

5. The system of claim 4, wherein the first fluid pathway comprises the first, second, third, and fourth fluid channels and wherein the second fluid pathway comprises the first and fourth fluid channels.

6. The system of claim 4, wherein the valve comprises first and second passages,
   wherein in the first configuration, the first passage fluidly couples the first and second ports and the second passage fluidly couples the third and fourth ports, and
   wherein in the second configuration, the first and second passages are actuated such that the first passage fluidly couples the first and fourth ports and the second passage fluidly couples the second and third ports.

7. The system of claim 4, wherein the valve comprises first and second passages,
   wherein in the first configuration, the first passage fluidly couples the first and second ports and the second passage fluidly couples the third and fourth ports, and
   wherein in the second configuration, the first and second passages are actuated such that the first passage fluidly couples the second and third ports and the second passage fluidly couples the first and fourth ports.

8. The system of claim 1, further comprising:
   an outer capillary tube extending from a proximal end to a distal end; and
   an inner capillary tube extending from a proximal end to a distal end and disposed within said outer capillary tube, wherein said distal end of the inner capillary tube is recessed relative to the distal end of the outer capillary tube so as to define the sample space between the distal end of the inner capillary tube, a portion of an inner wall of the outer capillary tube, and the distal end of the outer capillary tube,
   wherein said inner and outer capillary tubes define a desorption solvent conduit and a sampling conduit in fluid communication with one another via said sample space, said desorption solvent conduit extending from an inlet end configured to receive desorption solvent from the reservoir to an outlet end terminating at said sample space, and said sampling conduit extending from an inlet end commencing at said sample space for receiving from the sample space desorption solvent in which the desorbed analytes are entrained to an outlet end fluidly coupled to the ion source;
   an optionally wherein:
   an axial bore of the inner capillary tube at least partially defines the sampling conduit and wherein a space between the inner capillary tube and the outer capillary tube defines the desorption solvent conduit, wherein:
   the inlet end of the desorption solvent conduit is disposed in the first fluid pathway between the valve and the sample space; and
   the outlet end of the sampling conduit is disposed in the first fluid pathway between the sample space and the valve.

9. The system of claim 1, wherein the ion source is operable to discharge desorption solvent having said desorbed analytes entrained therein into an ionization chamber in fluid communication with a sampling orifice of a mass spectrometer.

10. The system of claim 1, further comprising a controller for controlling actuation of the valve between the first and second configurations, the controller configured to:
    move the valve to the second configuration for insertion of the substrate within desorption solvent within the sample space; and move the valve to the first configuration for flowing desorption solvent having analytes desorbed therein from the sample space to the ion source, wherein desorption solvent is delivered to the ion source substantially continuously when the switch is in each of the first and second configuration.

11. The system of claim 10, further comprising one or more pumps for flowing desorption solvent through the first and second pathways, the controller configured to control the flow rate of desorption solvent delivered by the one or more pumps such that desorption solvent forms a dome-like surface profile at the open end when the valve is moved to the second configuration and a vortex-shaped surface at the open end when the valve is moved to the first configuration and optionally:

wherein the controller is further configured to control the flow rate of desorption solvent delivered by the one or more pumps such that desorption solvent temporarily overflows from the sample space through the open end of the sampling probe when the valve is in the first configuration so as to at least one of clean the sampling probe and prevent sampling of airborne material before the substrate is inserted within the desorption solvent.

12. A method for chemical analysis, comprising:

inserting at least a portion of a substrate having one or more analytes adsorbed thereto into a desorption solvent contained within a sample space of a sampling probe for a first duration such that at least a portion of said absorbed analytes are desorbed from the coated surface into the desorption solvent, said sample space being partially defined by an open end of the sampling probe;

directing a flow of the desorption solvent from a reservoir of the desorption solvent to an ion source while bypassing the sample space during at least a portion of said first duration such that the volumetric flow rate of the desorption solvent in the sample space is substantially zero;

thereafter, re-directing the flow of desorption solvent from the reservoir to the ion source via said sample space such that said analytes desorbed into the desorption solvent within the sample space are delivered to the ion source; and ionizing the desorbed analytes entrained within the desorption solvent for mass spectrometric analysis.

13. The method of claim 12, wherein the substrate comprises one of a solid-phase microextraction substrate and surface functionalized particles.

14. The method of claim 12, wherein a valve for directing the flow of desorption solvent through a plurality of fluid pathways is disposed between the reservoir and the sample space, and wherein re-directing the flow of desorption solvent from the reservoir to the ion source via the sample space comprises actuating the valve from a first configuration to a second configuration.

15. The method of claim 14, wherein desorption solvent is delivered to the ion source substantially continuously when the valve is in the first and second configurations.

16. The method of claim 14, wherein a first fluid pathway is provided for flowing desorption solvent from said reservoir to said ion source via said sample space and a second fluid pathway is provided for flowing the desorption solvent from said reservoir to said ion source and that bypasses said sample space.

17. The method of claim 12, further comprising:

establishing the flow of the desorption solvent through the sample space prior to inserting said substrate within the sample space, wherein a flow rate of the desorption solvent within the sample space is configured to generate a dome-like surface profile of the desorption solvent at said open end when the substrate is inserted therein; and adjusting the flow rate of the desorption solvent within the sample space during said step of re-directing the flow of desorption solvent from the reservoir to the ion source via the sample space so as to generate a vortex-like surface profile of the desorption solvent at said open end.

18. The method of claim 12, further comprising adding one or more reagents to the sample space during said first duration for reacting with analytes that are at least one of adsorbed on the substrate and desorbed from the substrate.

* * * * *